H. CONN.
WAGON ATTACHMENT.
APPLICATION FILED NOV. 1, 1916.

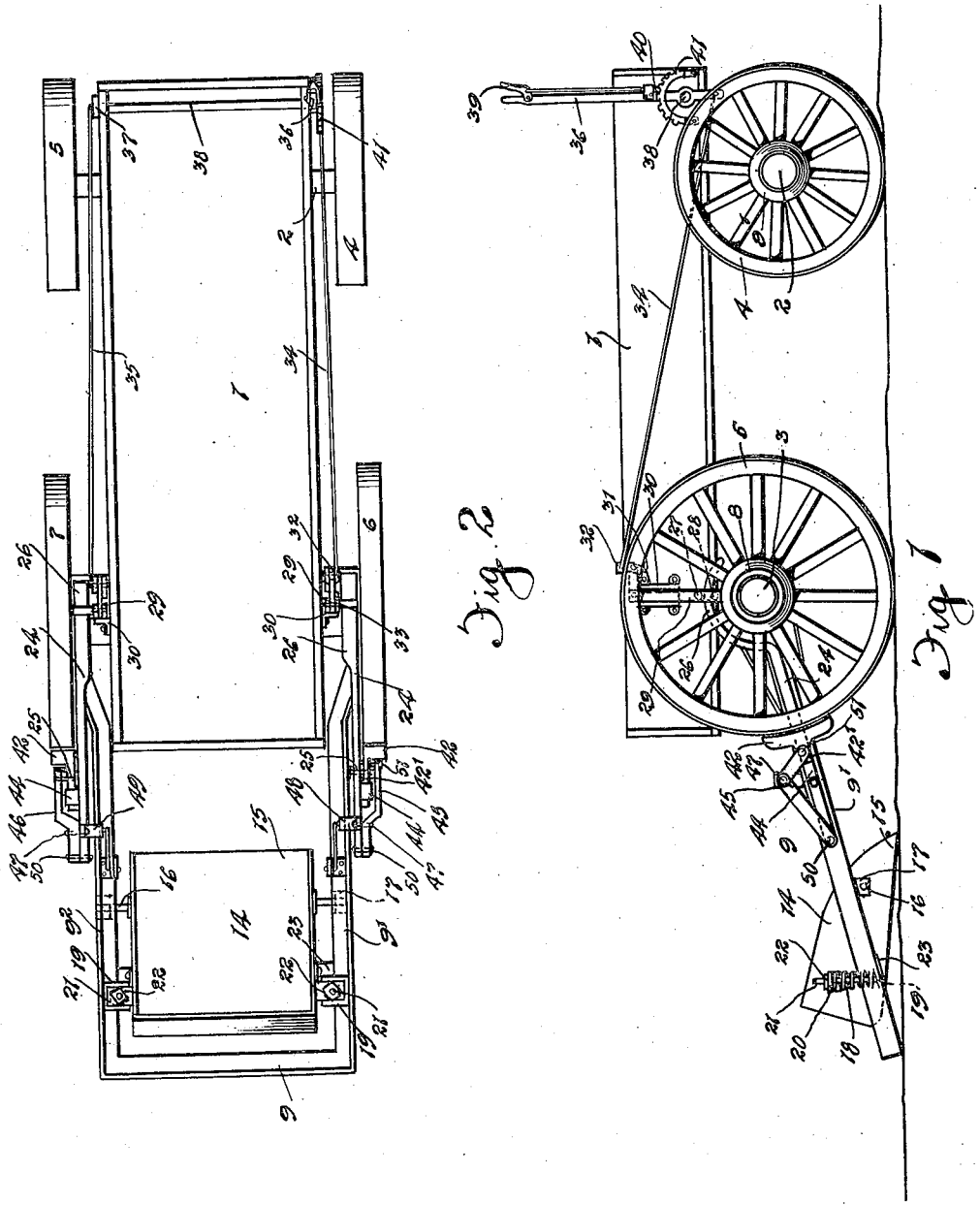

1,262,309.

Patented Apr. 9, 1918.
2 SHEETS—SHEET 2.

WITNESSES
Roland Foster
K. B. Wakefield

INVENTOR
H. Conn

Schustrhaugh & Co
Attorneys

UNITED STATES PATENT OFFICE.

HARRY CONN, OF KYLEMORE, SASKATCHEWAN, CANADA.

WAGON ATTACHMENT.

1,262,309.   Specification of Letters Patent.   Patented Apr. 9, 1918.

Application filed November 1, 1916. Serial No. 128,999.

*To all whom it may concern:*

Be it known that I, HARRY CONN, of the village of Kylemore, in the Province of Saskatchewan, Canada, have invented certain new and useful Improvements in Wagon Attachments, of which the following is the specification.

The invention relates to improvements in attachments to wagons and particularly to loading attachments and the principal object of the invention is to provide a strong, inexpensive and simply constructed attachment which can be readily attached to the rear end of a wagon and can be utilized for picking up material from the ground and elevating it at the will of the driver to a position where it can be dropped into the wagon box, and it consists essentially in an open ended carrying frame having the open end pivotally attached to the hubs of the wheels, a pick-up appliance located at the closed end of the frame, brake shoes carried by the sides of the frame and engageable with the wheel rims and means for manipulating the brake shoes to grip the wheels, the parts being arranged and constructed as hereinafter more particularly described and later pointed out in the appended claims, reference being had to the accompanying drawings in which:—

Figure 1 represents a side view of the complete invention.

Fig. 2 is a plan view of the same.

In the drawings like characters of reference indicate corresponding parts in each figure.

Figure 6:
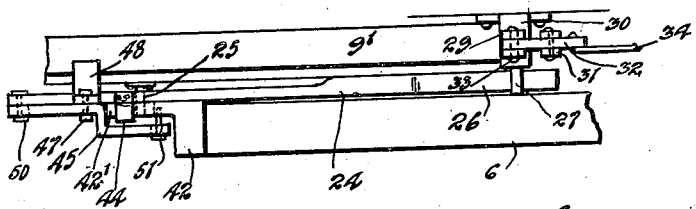
Fig. 6 is a plan view of the parts appearing in Fig. 5.
Figure 3:
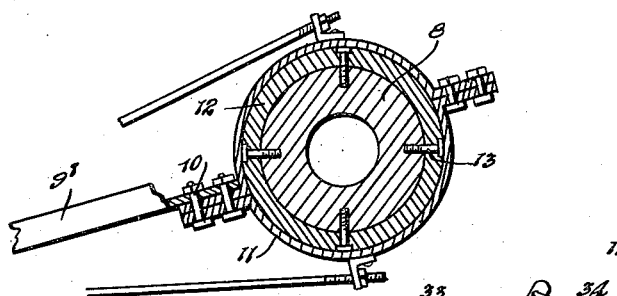
Fig. 3 is an enlarged detailed vertical sectional view through one of the hubs of the wheels.
Figure 4:
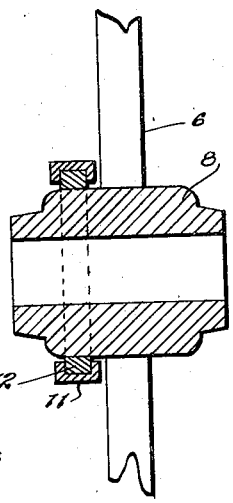
Fig. 4 is an enlarged detailed longitudinal sectional view through one of the hubs of the wheels.

1 represents a wagon box mounted in the usual way upon front and rear axles 2 and 3 which are carried by the front wheels 4 and 5 and rear wheels 6 and 7, said wheels being provided with the customary hubs 8 and 8'. These parts are all of ordinary construction and form no part of my invention.

My attachment, which is located at the rear end of the wagon, is now described.

It comprises an open ended rectangular frame 9, which frame has the forward ends of the side arms 9' and 9² thereof each attached by means of bolts 10 to a slip ring 11 of channel cross section, the slip ring being mounted on a band 12 permanently fastened by means of screws 13 to the hub of the wheel.

According to this arrangement it will be obvious that the carrying frame is pivotally swung from the hubs and extends considerably to the rear of the wagon. The carrying frame is provided with a pick-up appliance 14 which, in the present instance, is shown as a scraper 15 which is pivotally carried at the front end by studs 16 mounted in hangers 17 fastened to the side arms of the carrying frame. The rear end of the scraper is suspended by side springs 18 located between carrying brackets 19 and 20, the brackets 19 being secured to the side arms of the carrying frame, while those 20 are attached to the back end of the scraper.

Guide bolts 21 extend upwardly from the bottom brackets through the springs and top brackets and are provided with adjusting nuts 22.

According to this construction one can adjust the tension of the springs by manipulating the nuts to accommodate the scraper to the load which it carries.

Stops 23 extend outwardly from the sides of the scraper to the underside of the side arms 9' and 9², which stops are provided to limit the upward swing of the rear end of the scraper.

The side bars each carry a brake lever 24 which is pivotally mounted on a stud 25 extending from the side arm in each instance. The brake levers terminate in forward semicircular ends 26, which ends lie above the hubs of the rear wheels and are received at each side of the box between guide rollers 27 and 28 carried by a vertical sliding bar 29 fastened to the sides of the box by carrying straps 30. The bars carry short extension arms 31 and they are arranged so that the sliding arms operate vertically when moved and in a direction radial to the hubs of the rear wheels.

The extension arms 31 are fitted at each side of the box with pivoted bell cranks 32, which have their rear ends directed toward the upper end of the sliding bars to which they are attached by pins 33. The other ends of the bell cranks are connected by operating rods 34 and 35, one to the lower end of a hand lever 36 and the other to the lower end of a short lever or crank 37, the two levers being permanently mounted on a cross spindle 38 located at the front end of the wagon.

The lever 36 is supplied with the usual hand latch 39 and detent 40, the detent operating over a quadrant 41 fastened to the side of the wagon box.

From the above arrangement it will be obvious that the driver by manipulating the hand lever can effect the simultaneous movement of the sliding bars 29 and accordingly the simultaneous raising and lowering of the forward ends of the brake bars.

The outer ends of the studs 25 hereinbefore mentioned carry slidably the rearwardly projecting ends 42' of brake shoes 42, the ends of the shoes being slotted as indicated at 43 to receive the studs.

Straps 44 are secured to the brake levers and guide the extensions 42' of the brake shoes.

45 and 46 are similar actuating bell cranks pivotally mounted at 47 on brackets 48 and 49 secured to the side arms 9' and 9² of the carrying frame, said bell cranks having their rear ends pivotally connected at 50 to the rear ends of the brake levers and their forward ends pivotally connected as shown at 51 to the shoes.

In this connection it is to be noticed that the pivoted ends of the bell cranks are slotted at the pins to allow the free movement of the cranks when actuated.

Figure 5:
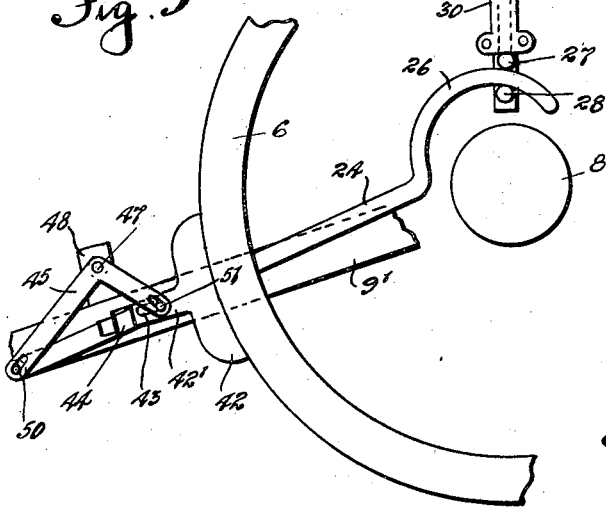
Fig. 5 represents an enlarged detailed side view of the main working parts of the attachment.

With this attachment on the wagon and considering one is picking up stones, dirt or other material the wagon is driven to load the material in the scraper, the brake shoes at this time being free of the wheels. After the scraper has been loaded the lever 36 is swung backwardly to effect the movement of the sliding bars 29 from the position shown in Fig. 1 of the drawings to that shown in Fig. 5, which movement causes the forward ends of the brake levers to be drawn away from the hubs. As the front ends of the brake levers go up the rear ends swing down and by so doing effect, through the bell cranks 45, the forward sliding of the shoes into engagement with the rims of the rear wheels. When the shoes have firmly gripped the wheels the lever 39 is locked and the wagon is pulled ahead. As it goes ahead, the carrier frame is swung upwardly by the brake shoes which hold to the wheels and the scraper is accordingly brought to a position where the material therein will slide out and dump into the wagon box.

I wish it here to be noticed that when the brake shoes have gripped the wheel rims the semi-circular ends of the brake levers are in a position concentric to the rear axle. Accordingly in the upward swinging of the carrying frame the semi-circular ends of the brake levers simply travel freely between the rollers.

Further, in connection with the scraper, it will be obvious that as soon as it is lifted from the ground the weight of the material in it will cause the rear end of it to swing downwardly until stopped by the springs. By having the springs properly adjusted one can be assured that the scraper will not dump prematurely when it is swung up.

Although I have shown and described a scraper as carried by the carrying frame, still it will be understood that any other device could be utilized at this point, the construction of which would adapt it best to accommodate the particular material it is desired to load.

What I claim as my invention is:—

1. The combination with the rear wheels of a wagon and the wagon box, of a pair of rearwardly extending side arms having their front ends pivotally mounted on the hubs of the wheels, a pick-up appliance carried by the rear ends of the arms, brake shoes slidably mounted on the side arms and positioned for engagement with the rims of the wheels, brake levers pivotally secured to the side arms and terminating forwardly in semi-circular ends located adjoining the hubs, an operating connection between the brake levers and the shoes adapted in the shifting of the front ends of the levers to engage the shoes with the wheel rims and means mounted on the box for shifting the front ends of the levers.

2. The combination with the rear wheels of a wagon and the wagon box, of a pair of rearwardly extending side arms having their front ends pivotally mounted on the hubs of the wheels, a pick-up appliance carried by the rear ends of the arms, brake shoes slidably mounted on the side arms and positioned for engagement with the rims of the wheels, brake levers pivotally secured to the side arms and terminating forwardly in semi-circular ends located above the ends of the wheels, bell cranks pivotally suspended from side arms and connected to the brake shoes and the rear ends of the brake levers, sliding bars attached to the wagon box in a position radial to the hubs, guide rollers carried by the sliding bars and receiving the semi-circular ends of the brake levers and means operated from the front end of the wagon box for sliding the sliding bars to shift the forward ends of the brake levers and effect the engagement of the shoes with the rims of the wheels.

Signed at Winnipeg, this 28th day of August, 1916.

HARRY CONN.

In the presence of—
G. S. ROXBURGH,
ROLAND FOSTER.

Copies of this patent may be obtained for five cents each, by addressing the "Commissioner of Patents, Washington, D. C."